M. Simons.
Tea & Coffee-Pot.

Nº 75651      Patented Mar. 17, 1868

Witnesses
C. D. Mayhew
Daniel Reigart

Inventor.
Michael Simons
By his Atty
J. F. Reigart

United States Patent Office.

MICHAEL SIMONS, OF MIDDLETOWN, CONNECTICUT.

Letters Patent No. 75,651, dated March 17, 1868.

IMPROVEMENT IN TEA AND COFFEE-POTS.

The Schedule referred to in these Letters Patent and making part of the same.

TO ALL WHOM IT MAY CONCERN:

Be it known that I, MICHAEL SIMONS, of Middletown, Middlesex county, State of Connecticut, have invented an Improved Movable Strainer for Tea and Coffee-Pots; and I do hereby declare the following to be an exact description thereof, reference being had to the accompanying drawings, and to the letters of reference marked thereon, making part of this specification.

The nature of my invention consists in the form and construction of a sliding strainer, the strainer being convex on the inside, so that the tea or coffee cannot rest against the strainer, but rolls off to each side, and keeps the strainer free and open, and prevents the tea-leaves or coffee-grounds from choking up the mouth of the spout.

Figure 1:
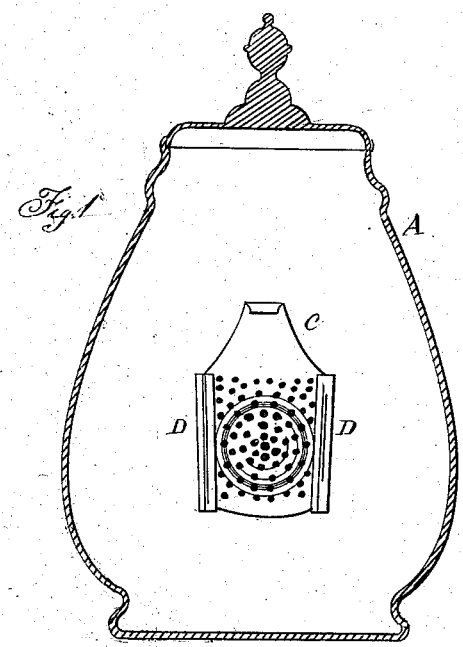

Figure 1 represents a front view of the strainer.

Figure 2:
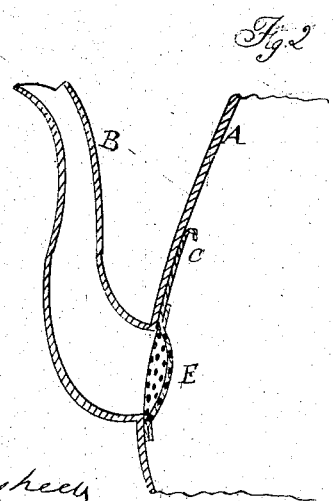

Figure 2, a side view.

A represents the tea or coffee-pot; B, the spout; C, the top of the strainer, which is the handle, by which the strainer is at any time drawn out from between the guides D, when it is necessary to clean out the inside of the coffee or tea-pot. The centre of the strainer is convex, as shown at E, fig. 2. This is for the purpose of preventing the grounds or tea-leaves from collecting against the strainer, and choking up the spout, strainers having usually the form corresponding with the inside of the coffee-pot, so that the grounds and leaves collected, and choked up the spout, but the centre of my strainer is round and convex, always keeping the spout clear.

What I claim as my invention, and desire to secure by Letters Patent, is—

The construction of the sliding strainer, with its round and convex centre, E, to prevent the grounds from choking up the spout, as herein described and set forth.

MICHAEL SIMONS.

Witnesses:
J. FRANKLIN REIGART,
EDM. F. BROWN.